United States Patent [19]

Watanabe et al.

[11] Patent Number: 5,112,790

[45] Date of Patent: May 12, 1992

[54] CATALYST FOR PURIFICATION OF EXHAUST GASES

[75] Inventors: Yoshihide Watanabe; Mareo Kimura; Shinichi Matsumoto, all of Aichi, Japan

[73] Assignees: Kabushiki Kaisha Toyota Chuo Kenkyusho, Aichi; Toyota Jidosha Kabushiki Kaisha, Toyota, both of Japan

[21] Appl. No.: 515,420

[22] Filed: Apr. 27, 1990

[30] Foreign Application Priority Data

May 1, 1989 [JP] Japan .................................. 1-112488

[51] Int. Cl.$^5$ ..................... B01J 27/185; B01J 27/182; B01J 27/188; C01B 53/34
[52] U.S. Cl. .................. 502/213; 423/213.5; 423/239; 502/208; 502/210; 502/214
[58] Field of Search ................. 502/213, 214; 423/213.5, 239

[56] References Cited

U.S. PATENT DOCUMENTS

| | | | |
|---|---|---|---|
| 3,449,063 | 6/1969 | Griffing et al. | 423/213.5 |
| 3,540,838 | 11/1970 | Reitmeier et al. | 423/213.5 |
| 4,297,328 | 10/1981 | Ritscher et al. | 423/213.2 |
| 4,710,485 | 12/1987 | Miller | 502/214 |
| 4,874,590 | 10/1989 | Staniulis et al. | 423/239 |

FOREIGN PATENT DOCUMENTS

| | | |
|---|---|---|
| 0100267 | 2/1984 | European Pat. Off. . |
| 0171151 | 2/1986 | European Pat. Off. . |
| 0216444 | 4/1987 | European Pat. Off. . |
| 0306050 | 3/1989 | European Pat. Off. . |
| 1010783 | 11/1965 | United Kingdom ............. 423/213.5 |

Primary Examiner—Paul E. Konopka
Attorney, Agent, or Firm—Oblon, Spivak, McClelland, Maier & Neustadt

[57] ABSTRACT

A catalyst used for purifying exhaust gases resulting from the combustion of a lean fuel-air mixture mixture comprises a porous support material having a framework formed by $MO_2$, where M is silicon or a metal, $AlO_2$ and $PO_2$, and at least one base metal and at least one metal of the platinum group which are carried on ion exchange sites of the support material a coexistent state. The catalyst exhibits a high level of $NO_x$ conversion for a long time even at a high temperature owing to the high heat resistance and durability of the support material, and the cooperative action of the two kinds of metals, i.e. the promotion of the catalytic action of the base metal (e.g. copper) by the metal of the platinum group (e.g. palladium) serving as cocatalyst.

6 Claims, No Drawings

CATALYST FOR PURIFICATION OF EXHAUST GASES

BACKGROUND OF THE INVENTION

1. Field of the Invention

This invention relates to a catalyst for purifying exhaust gases. More particularly, it is a catalyst which is suitable for purifying exhaust gases discharged by an internal combustion engine, or the like, having a high temperature and resulting from the combustion of a fuel-air mixture containing an excess of oxygen.

2. Description of the Related Art

It is important from the standpoint of energy saving to reduce the consumption of fuel in an internal combustion engine for an automobile, etc. This has hitherto been achieved by, for example, burning a lean fuel-air mixture containing an excess of oxygen on driving. The use of a lean fuel-air mixture has, however, been found to bring about a serious problem associated with the combustion product thereof. Its combustion product contains various harmful substances, such as HC, CO and $NO_x$. Although HC and CO can be removed by oxidation, the removal of $NO_x$, which need be accomplished by reduction, is difficult, since the contact of $NO_x$ with a catalytically active element for purifying exhaust gases is greatly hindered by the oxygen which has been adsorbed to the catalyst bed. Even if $NO_x$ may satisfactorily contact the catalytically active element and be reduced to nitrogen, the nitrogen immediately combines with the oxygen in the catalyst bed. Thus, it has hitherto been possible to achieve only a very low degree of efficiency in the catalytic purification of exhaust gases, as far as the removal of $NO_x$ is concerned.

U.S. Pat. No. 4,297,328 discloses a catalyst developed to solve the problem as hereinabove pointed out. It comprises a support of zeolite carrying copper in the numerous pores which it has in its surface, and is used for removing $NO_x$ by reduction in an oxidizing atmosphere. This catalyst is, however, unacceptable for bility of zeolite.

SUMMARY OF THE INVENTION

Under these circumstances, it is an object of this invention to provide a catalyst for the purification of exhaust gases which exhibits satisfactorily high levels of heat resistance an ddurability, even if it may remain exposed to the product of combustion of a lean fuel-air mixture containing an excess of oxygen, and which is very effective for removing $NO_x$, too.

This object is essentially attained by a catalyst which comprises a porous support having a framework formed by $MO_2$, where M is Si, or a metal element selected from Mg, Mn, Zn, Co, Fe, Ti, etc., $AlO_2$ and $PO_2$, and catalytically active elements composed of at least one base metal and at least one metal of the platinum group, carried on ion exchange sites of the support in a coexistent state.

Other objects, features and advantages of this invention will become apparent from the following description.

DETAILED DESCRIPTION OF THE INVENTION

According to a primary aspect of this invention, there is provided a catalyst which comprises a porous support having a framework formed by $MO_2$, where M is Si, or a metal element selected from Mg, Mn, Zn, Co, Fe, Ti, etc., $AlO_2$ and $PO_2$, and catalytically active elements composed of at least one base metal and at least one metal of the platinum group, carried on ion exchange sites of the support in a coexistent state. The material of which the porous support consists will hereinafter be called silicoaluminophosphate when M is Si, or metalloaluminophosphate when M is a metal element. Both of silicoaluminophosphate and metalloaluminophosphate are usually crystalline, though they may be available in noncrystalline form, too.

Silicoaluminophosphate has a framework which not decay even at a temperature as high as 900° C. to 1000° C. The pores which it has in its surface are not broken or reduced in size, even if it may remain exposed to any such high temperature. Therefore, the support for the catalyst according to this invention is by far superior to zeolite, etc. in heat resistance and durability. The same is true of metalloaluminophosphate.

The numerous pores which exist in the surface of the porous support are slightly larger in diameter than $NO_x$ molecules. It carries a by far greater amount of catalytically active elements in its pores than on its surface. $NO_x$ molecules being polar are selectively drawn into the pores and the reduction thereof takes place mainly as a result of their contact with the catalytically active elements in the pores, in the presence of hydrocarbons. Therefore, the reaction for the reduction of $NO_x$ is hardly hindered by oxygen, but can be accomplished for removing $NO_x$ effectively even in an atmosphere containing an excess of oxygen.

The catalyst of this invention carries both a base metal (e.g. Cu) and a metal of the platinum group (e.g. Pd) on its porous support. The use of these two kinds of metal together enables a higher efficiency of $NO_x$ removal than is possible when copper, or like metal is used alone. This is probably, though not certainly, due to the fact that palladium (or like metal) promotes the formation of $Cu^{1+}$ which plays an important role in the decomposition of $NO_x$ which is understood as being achieved by the following reaction when a copper catalyst is used in an atmosphere containing an excess of oxygen:

$$Cu^{1+} - NO \rightarrow Cu^{2+} - NO^-$$

$$2(Cu^{2+} - NO^-) \rightarrow 2Cu^{1+} + N_2 + O_2$$

If palladium is also used, resulting in the presence of $Cu^{2+}$ and $Pd^{2+}$ together, the hydrocarbon in the exhaust gas is oxidized on $Pd^{2+}$ to form $Pd^0$ and $Pd^0$ is, then, oxidized by $Cu^{2+}$ to form $Cu^{1+}$ which plays an important role in the decomposition of $NO_x$.

According to a more specific aspect of this invention, the porous support comprises a crystalline silicoaluminophosphate having uniformly sized pores with a nominal diameter exceeding about 3 Å, and represented principally by the following formula as determined experimentally when it is an anhydrous compound:

$$(Si_xAl_yP_z)O_2$$

where $x+y+z=1$, $0.01 \leq x < 0.8$, and $0.01 \leq z$.

The pores preferably have a nominal diameter of about 5 to 10 Å which is slightly larger than the diameter of $NO_x$ molecules. The value of x representing the proportion of silicon in the compound is preferably in the range of 0.05 to 0.25. If x is less than 0.05, it is possible that the compound may lower its property of being a solid acid and fail to achieve a complete ion exchange, resulting in a catalyst of low activity. If, on the other hand, x is over 0.25, the compound may lower its heat resistance and hence its durability.

The base metal is preferably selected from the 3d transition metals, such as Cu, Co, Cr, Fe, Mn, etc. Copper is, among others, preferred. The metal of the platinum group is preferably selected from Pd, Pt, Rh, Ir, Ru, and the like. Palladium is, among others preferred.

There is no definite limitation to the proportions of the base metal and the metal of the platinum group to be employed. When, for example, copper and palladium are employed, however, it is preferable to employ 10 to 50% by weight of palladium based on the weight of copper. If only less than 10% by weight of palladium is employed, no satisfactory formation of $Cu^{1+}$, which is considered to form an active site for the decomposition of $NO_x$, is likely to be achieved. If, on the other hand, over 50% by weight of palladium is employed, an oxidizing reaction is likely to take place more actively than a reducing reaction. In either case, a high $No_x$ conversion would not be achieved.

The catalytically active elements can be caused to adhere to the porous support by ion exchange, impregnation, etc. Ion exchange is particularly preferable, as it enables the metals to adhere strongly to the support. It can be performed either by a simultaneous process using a solution of a mixture of the metals, or by a multistage process using solutions of the individual metals.

The two kinds of metals can exist together in a variety of patterns on the porous support. For example, they may exist alternately, or may form a shell structure in which one kind of metal cover the surfaces of the other. Any other pattern can, of course, be employed if the two kinds of metals are positioned so close to each other as to be capable of performing their cooperative action for the decomposition of $NO_x$ as hereinabove described.

Description will now be made of a process for manufacturing the catalyst including silicoaluminophosphate. The silicoaluminophosphate can be synthesized in a customary way. For example, an organic substance is incorporated into a uniform mixture of a phosphate, hydrated alumina and silica sol, etc. to form a porous structure, and after the whole has been stirred to make a uniform mixture, it is caused to undergo a hydrothermal reaction for synthesizing a powder of crystalline silicoaluminophosphate.

Then, the powder is loaded with a base metal and a metal of the platinum group. This can be accomplished is employed, the powder is dipped in an aqueous solution salts of the elements, is removed from it after a period of one to two hours, and is left in the open air to dry. When the latter method is employed, the powder is left in an aqueous element salt solution for a whole day and night, is removed from it, and is washed with water, and after the dipping and washing procedures have been repeated up to several times if required, the powder is calcined at a temperature of 500° C. to 700° C. for several hours. In either case, a catalyst in powder form is obtained.

While the catalyst is, of course, ready for immediate use, it is alternatively possible to add a binder, such as an alumina or silica sol, to the powder and mold it into a desired shape. It is also possible to prepare an aqueous slurry of the powder and apply it to a base of the honeycomb or other construction formed from a refractory material such as alumina.

EXAMPLES

The invention will now be described in further detail with reference to several specific examples.

EXAMPLE 1

Several catalysts embodying this invention were prepared, and heated in a model gas produced by burning a lean fuel-air mixture containing an excess of oxygen. Then, the percentage of $NO_x$ conversion by each catalyst was determined as a measure of its purification activity. A comparative catalyst was also prepared and tested in the same way.

Preparation of Catalysts Nos. 1 to 5 Embodying the Invention

Catalyst No. 1

A homogeneous mixture was prepared by mixing 10.4 g of 85 wt. % orthophosphoric acid ($H_3PO_4$) and 26.0 g of water, adding 6.0 g of hydrated aluminum oxide in the form of pseudoboehmite, and stirring the whole. It was mixed under stirring with 3.0 g of 20 wt. % colloidal silica ($SiO_2$), and then with 8.4 ml of n-triethylamine to form a homogeneous mixture. The mixture was placed in a pressure vessel made of stainless steel and lined with polytetrafluoroethylene, and was heated at 180° C. for 72 hours to undergo a reaction. After the reacted mixture had been removed from the vessel, a solid reaction product was collected from it by filtration, washed with water, and dried. The solid product was calcined at 600° C. for an hour for the removal of any organic matter by decomposition, whereby a crystalline silicoaluminophosphate was obtained. It had a chemical composition represented as $(Si_{0.05}Al_{0.50}P_{0.45})O_2$ and a pore diameter of about 8 Å.

The silicoaluminophosphate was dipped in a mixed aqueous solution containing copper acetate and palladium acetate at the concentrations of 0.1 and 0.03 M, respectively. After 24 hours, it was collected by filtration, washed with water. Then, it was calcined at 600° C. for two hours, whereby a crystalline silicoaluminophosphate catalyst carrying copper and palladium as a result of ion exchange was prepared as Catalyst No. 1. This catalyst was found to carry about 2.0% by weight of copper and about 0.5% by weight of palladium.

Catalyst No. 2

The process which had been employed for preparing Catalyst No. 1 was repeated for preparing Catalyst No. 2, except that the amounts of orthophosphoric acid and colloidal silica were changed to 9.2 and 6.0 g, respectively. The resulting silicoaluminophosphate was of the formula $(Si_{0.1}Al_{0.5}P_{0.4})O_2$. Catalyst No. 2 carried the same amounts of copper and palladium as those on Catalyst No. 1.

Catalyst No. 3

The process which had been employed for preparing Catalyst No. 1 was repeated for preparing Catalyst No. 3, except that the amounts of orthophosphoric acid and colloidal silica were changed to 5.8 and 15.0 g, respectively. The resulting silicoaluminophosphate was of the formula $(Si_{0.25}Al_{0.5}P_{0.25})O_2$. Catalyst No. 3 carried the same amounts of copper and palladium as those on Catalyst No. 1.

Catalyst No. 4

The process which had been employed for preparing Catalyst No. 2 was repeated for preparing a crystalline silicoaluminophosphate having the formula $(Si_{0.1}Al_{0.5}P_{0.4})O_2$. It was dipped in a mixed aqueous solution containing copper acetate and palladium acetate at the concentrations of 0.1 and 0.01 M, respectively, and after 24 hours, the filtration, washing and calcining steps of the process which had been employed for preparing Catalyst No. 1 were repeated for preparing a crystalline silicoaluminophosphate catalyst carrying copper and palladium as Catalyst No. 4. It was found to carry about 2.4% by weight of copper and about 0.15% by weight of palladium.

Catalyst No. 5

The process which had been employed for preparing Catalyst No. 4 was repeated for preparing Catalyst No. 5, except that the silicoaluminophosphate was dipped in a mixed aqueous solution containing copper acetate and palladium acetate at the concentrations of 0.04 and 0.06M, respectively. Catalyst No. 5 was found to carry about 1.2% by weight of copper and about 1.1% by weight of palladium.

Preparation of Comparative Catalyst No. C1

Zeolite having an Si/Al ratio of 40 was dipped in a 0.1M aqueous solution of copper acetate, and after 24 hours, it was collected by filtration, washed, and calcined at 600° C. for two hours. This ion-exchange process yielded a zeolite catalyst carrying copper as Comparative Catalyst No. C1. It was found to carry 3% by weight of copper.

Heat Resistance and Durability Tests

Catalysts Nos. 1 to 5 and Comparative Catalyst No. C1, which were all in powder form, were each heated for five hours each at temperatures of 500° C., 600° C., 700° C. and 800° C. in a model gas produced by burning a lean fuel-air mixture having an air to fuel ratio of about 22 and containing an excess of oxygen. The model gas contained 0.47% of CO, 8.4% of $O_2$, 0.16% of $H_2$, 9.0% of $CO_2$, 0.1% of $C_3H_6$ (total hydrocarbons in terms of C1 (THC) 3000 ppm), and 1000 ppm of NO.

Evaluation of Catalyst for Purifying Activity

Each catalyst was, then, evaluated for its NO conversion at room temperature and elevated temperatures up to 800° C. as shown in TABLE 1 below. The evaluation was carried out by molding the catalyst powder under pressure to form pellets having a diameter of about 2 mm, putting them in an experimental catalytic converter, and introducing a model exhaust gas into it. The gas contained 0.10% of CO, 4.0% of $O_2$, 0.03% of $H_2$, 0.04% of $C_3H_6$ (0.12% as THC), 10.0% of $CO_2$, and 670 ppm of NO, and was introduced at a gas hourly space velocity (GHSV) of about 30,000 per hour. TABLE 1 shows the maximum conversion that was achieved by each catalyst at each of the temperatures employed for the evaluation. TABLE 1 confirms the superiority of all of the catalysts embodying this invention to the comparative catalyst in heat resistance and durability.

TABLE 1

| Temp. °C. | NO conversion (%) Catalyst No. | | | | | |
|---|---|---|---|---|---|---|
| | 1 | 2 | 3 | 4 | 5 | C1 |
| Room | 52 | 55 | 50 | 43 | 30 | 62 |
| 500 | 50 | 52 | 45 | 40 | 25 | 58 |
| 600 | 47 | 50 | 35 | 38 | 20 | 27 |
| 700 | 46 | 45 | 20 | 35 | 18 | 8 |
| 800 | 30 | 30 | 15 | 22 | 11 | 0 |

EXAMPLE 2

A catalyst embodying this invention was evaluated for heat resistance and durability in a situation simulating its use for purifying exhaust gas discharged by an engine in an automobile running through an urban area. A comparative catalyst was also prepared and tested.

Preparation of Catalyst No. 6 Embodying the Invention

Catalyst No. 2, which had been prepared in EXAMPLE 1, was pulverized in a ball mill to form a powder having an average particle diameter of 5 microns. A slurry having a viscosity of 200 to 300 cps was made by mixing 100 parts by weight of the powder, 20 parts by weight of silica sol having a solid content of 10%, and 50 parts by weight of water. The slurry was applied to a commercially available honeycomb base formed from cordierite, having 400 cells and defining a volume of 1.7 liters. After a stream of air had been blown against the base for removing any excess of the slurry from its surface, the slurry was dried and calcined, whereby catalyst No. 6 was prepared. It was found to contain 140 g of crystalline silicoaluminophosphate carrying copper and palladium per liter of the volume of the base.

Preparation of Comparative Catalyst No. C2

The process which had been employed for preparing Catalyst No. 6 was followed for preparing Comparative Catalyst No. C2 from Comparative Catalyst No. C1.

Evaluation of Catalysts for Purifying Activity

A durability test was conducted on each of Catalyst No. 6 embodying this invention and Comparative Catalyst No. C2 in a situation simulating its use for purifying exhaust gas from an engine in an automobile running through an urban area. The test was conducted by placing each catalyst in a converter and mounting the converter in the exhaust system of a 1.6-liter lean-burn engine. The conversion of $NO_x$ by each catalyst was measured every 200 hours. The test was continued for 600 hours at the maximum temperature of 750° C., while the engine was fed with a lean fuel-air mixture having an average air-fuel ratio of 22. The results are shown in TABLE 2.

As is obvious from TABLE 2, Catalyst No. 6 embodying this invention exhibited by far higher level of $NO_x$ conversion than that shown by Comparative Catalyst No. C2, throughout the test conducted by simulating its actual use in an automobile running through an urban area. It was found to maintain a practically satisfactory level of $NO_x$ conversion even at the end of 600 hours.

TABLE 2

| Catalyst No. | NO$_x$ conversion (%) Time elapsed, h. | | | |
| --- | --- | --- | --- | --- |
|  | 0 | 200 | 400 | 600 |
| 6 | 50 | 48 | 45 | 40 |
| C2 | 51 | 15 | 10 | 8 |

What is claimed is:

1. A catalyst for purifying exhaust gases comprising: a porous support material having a silicoaluminophosphate framework with a chemical composition represented by the formula $$(Si_xAl_yP_z)O_2$$

where $x+y+z=1$, $0.01 \leq x > 0.8$, and $z \geq 0.01$, when it is an anhydrous form; and catalytically active elements comprising at least one base metal selected from Cu and Co and at least one metal of the platinum group selected from Pd, Pt and Rh, said at least one base metal and said one metal of the platinum group being carried on ion exchange sites of said framework in a coexistent state, said framework having uniformly sized pores with a diameter exceeding 3 Å and carrying said metal of the platinum group in an amount ranging from 10 to 50% by weight of said base metal.

2. The catalyst as set forth in claim 1, wherein said diameter is between 5 and 10 Å.

3. The catalyst as set forth in claim 1, wherein the value of said x is from 0.05 to 0.25.

4. The catalyst as set forth in claim 1, wherein said base metal is copper, and said metal of the platinum group is palladium.

5. The catalyst of claim 1, wherein said base metal and said metal of the platinum group form a mixture in which they exist alternately.

6. The catalyst of claim 1, wherein said base metal and said metal of the platinum group are carried on said ion exchange sites in a manner that one of said metals covers the surface of the other.

* * * * *